United States Patent [19]

Owens et al.

[11] Patent Number: 4,646,860

[45] Date of Patent: Mar. 3, 1987

[54] PERSONNEL EMERGENCY CARRIER VEHICLE

[75] Inventors: Lester J. Owens, Titusville; Otto H. Fedor, Satellite Beach, both of Fla.

[73] Assignee: The United States of America as represented by the Administrator of the National Aeronautics and Space Administration, Washington, D.C.

[21] Appl. No.: 751,644

[22] Filed: Jul. 3, 1985

[51] Int. Cl.$^4$ ............................................. B62D 51/04
[52] U.S. Cl. ..................................... 180/19.2; 5/81 R; 60/415; 180/305; 280/47.11; 296/20
[58] Field of Search ............... 180/302, 305, 19.3, 180/19.2, 907; 296/20; 5/81 R, 82 R; 60/413, 415; 280/47.11

[56] References Cited

U.S. PATENT DOCUMENTS

| | | | |
|---|---|---|---|
| 1,477,398 | 12/1923 | Valentine | 180/19.2 |
| 1,737,493 | 11/1929 | Crank | 5/81 R |
| 2,876,854 | 3/1959 | Tetyak | 180/19.3 |
| 3,304,116 | 2/1967 | Stryker | 296/20 |
| 3,377,078 | 4/1968 | Jackson | 296/20 |
| 3,380,546 | 4/1968 | Rubjohn | 180/19.3 |
| 3,729,002 | 4/1973 | Miller | 5/82 |
| 3,903,696 | 9/1975 | Carmen | 180/305 |
| 4,300,782 | 11/1981 | Pioth | 296/20 |
| 4,352,991 | 10/1982 | Kaufman | 296/20 |
| 4,466,245 | 8/1984 | Arold | 60/415 |

Primary Examiner—David M. Mitchell
Attorney, Agent, or Firm—James O. Harrell; John R. Manning; Robert D. Marchant

[57] ABSTRACT

A personnel emergency carrier vehicle is disclosed which includes a vehicle frame (10) supported on steerable front wheels (20, 22) and driven rear wheels (36, 38). A supply (78) of breathing air is connected to quick connect face mask couplings (112, 114) and umbilical cord couplings (116, 118) for supplying breathing air to an injured worker or attendant either with or without a self-contained atomspheric protection suit for protection against hazardous gases at an accident site. A nonsparking hydraulic motor (90) is utilized to drive the vehicle and suitable direction (134) and throttling controls (138, 134) are provided for controlling the delivery of a hydraulic driving fluid from a pressurized hydraulic fluid accumulator (100). A steering axis (80) is steerable through a handle (82) to steer the front wheels (20, 22) through a linkage assembly (84, 28, 30).

13 Claims, 4 Drawing Figures

PERSONNEL EMERGENCY CARRIER VEHICLE

ORIGIN OF THE INVENTION

The invention described herein was made in performance of work under a NASA Contract, and is subject to the provisions of Section 305 of the National Aeronautics and Space Act of 1968, Public Law 85-568 (72 Stat. 435,002 U.S.C. 2457).

BACKGROUND OF THE INVENTION

The invention relates to an emergency carrier vehicle for carrying an injured worker at dangerous operational sites, such as, a space vehicle launch pad where hazardous fluids (gas and liquid) may be present. Each of these fluids has one or more adverse characteristics such as being toxic, flammable, explosive, corrosive, carcinogenic, asphyxiating, or extremely cold. If an accident were to occur involving a sizable spill of one or more of these hazardous fluids, it may be necessary to restrict automotive type vehicles, including ambulances from the launch pad area because any spark from their electrical systems could easily set off an explosion.

Removal of an injured worker, therefore becomes a problem to which considerable attention needs be given because he may have to be carried up six-tenths of a mile from the launch pad area. It is to be understood that this emergency carrier vehicle may also be used at other sites where hazardoud fluids are present, such as, mines, refiners, gas storage facilities, etc.

During hazardous operations the "Buddy System" is frequently used, i.e., two people work together to aid each other in case of injury or other distressful condition. Dispatch of rescue personnel into a hazardous situation should not be permitted unless there is a reasonable chance for a safe exit. Therefore, only one person may be available to assist his fellow worker in reaching a safe haven or medical help when an injury does occur.

Many toxic vapors when inhaled trigger the release of body fluids into the lungs. If the exposed person is laid horizontal, the risk of drowning from body fluid is much greater than if the patient is held in a more upright position. Therefore, a semi-reclining position for such a person has been found to be desirable.

Accordingly, an important object of the present invention is to provide a personnel emergency carier vehicle for transporting an injured worker from the site of an accident where hazardous fluids and gases are present.

Still another important object of the present invention is to provide a personnel emergency carrier vehicle for use in removing an injured worker from an accident site at which hazardous gases are present which includes protective breathing apparatus which may be utilized with or without protective clothing.

Still another important object of the present invention is to provide a self-powered, non-sparking emergency carrier vehicle for removing an injured worker from an accident site where hazardous, explosive gases are present.

Still another important object of the present invention is to provide a personnel emergency carrier vehicle which can transport one injured worker for a distance of up to three thousand feet, which can travel as fast as twenty miles per hour or as slow as one mile per hour, and which has no electrical sparks nor heat sources such as in internal combustion engines.

Still another important object of the present invention is to provide a personnel emergency carrier vehicle which may be used with a self-contained atmospheric protection ensemble (SCAPE) suit which is customarily used at space vehicle launch pad areas.

SUMMARY OF THE INVENTION

The above objectives are accomplished according to the present invention by providing a wheeled vehicle having a pair of front steerable wheels, a pair of rear driven wheels and a contoured patient carrying platform carried by the wheeled frame. A non-sparking, non-heat producing propulsion motor is provided by means of a hydraulic motor driven by a source of pressurized hydraulic fluid. A flow control valve provides forward and reverse operation of the hydraulic motor. The control valve may also include a variable speed throttling device for the hydraulic motor. A hydraulic braking valve provides for braking of the vehicle. A breathing air tank is carried on the vehicle and a control panel includes a pair of face mask breathing connections to which a face mask may be attached for use on the injured worker as well as by the attendant operator of the vehicle. In addition, the control panel includes a pair of umbilical cord connectors which can make connection to a suit of the injured worker which is of the type having a self-contained atmospheric environment. Steering is provided by means of a steering mechanism having a steering axis and a handle extending out from the steering axis at the rear of the vehicle wherein the handle may be twisted to control the speed of the vehicle.

BRIEF DESCRIPTION OF THE DRAWINGS

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
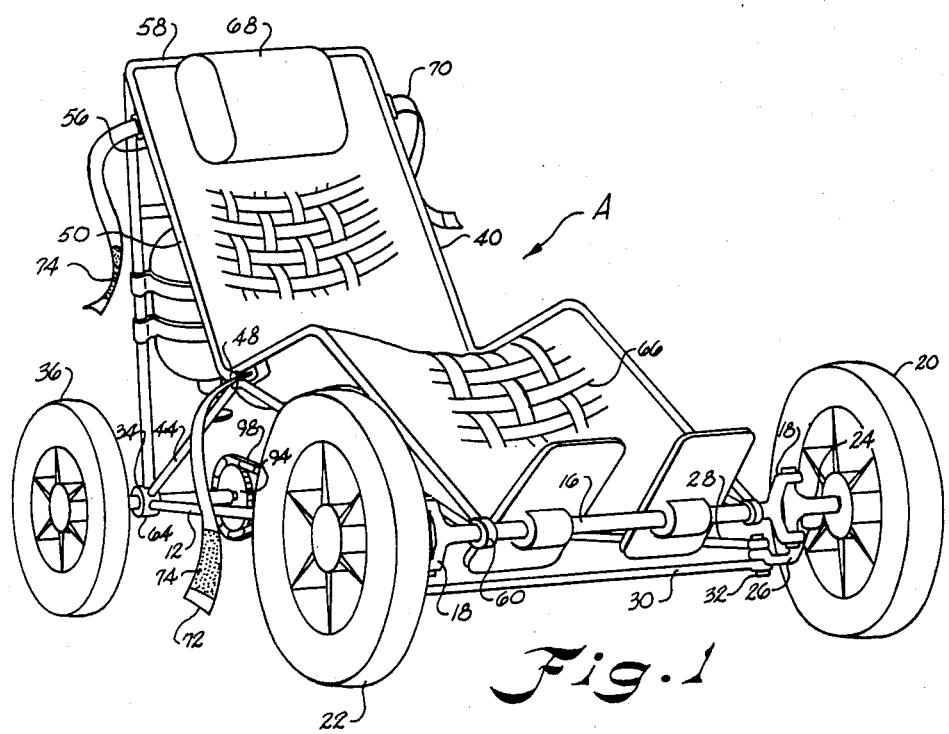
FIG. 1 is a perspective view illustrating a personnel emergency carrier vehicle constructed according to the present invention for transporting an injured worker at an accident site at which hazardous gases are present.

Referring now in more detail to the drawings, a personnel emergency carrier vehicle is illustrated generally at A in FIG. 1. The vehicle includes a vehicle frame 10 which comprises a pair of side frame members 12. A front frame member 16 is carried at the front of the vehicle having a pair of yokes 18 which support a pair of steerable front wheels 20 and 22. Each wheel includes a T-element 24 whose opposing arms are rotatably received in openings in the arms of the yoke 18. The horizontal sections of the T-elements 24 serves as axles for wheels 20 and 22. A steering arm 26, commonly referred to as a pittman-type arm, is carried by each T-element 24 and affixed thereto as a unit. There is a steering rod 28 connected to one of the steering arms 26. There is a transverse rod 30 having an end thereof connected to one end of the steering rod 28 and also to the steering arm 26 by means of a pin 32. The other end of transverse rod 30 is connected to the other steering arm 26. Accordingly, as the steering rod 28 is moved the steering motion is transmitted to both wheels 20 and 22. The movement of the steering rod 28 by an operator will be described hereinafter. There is a rear axle 34 to which a pair of driven wheels 36 and 38 are fixed for rotation.

Figure 2:
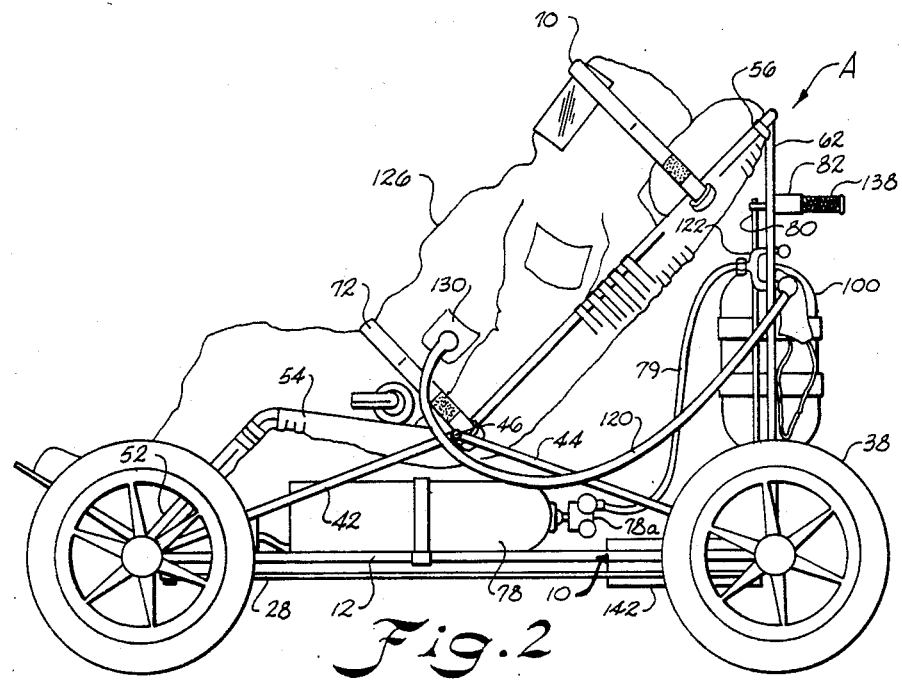
FIG. 2 is a side elevation illustrating a personnel emergency carrier vehicle constructed according to the invention for transporting an injured worker wearing a self-contained atmospheric protection suit as is typically utilized at the sites of space launch vehicles.

A contoured patient carrying platform is provided in the form of a seat 40. The central portion of contoured seat 40 is supported on each side of the vehicle frame 10 by triangular frame members 42 and 44 which join at an apex portion 46 and are pinned together by a pin 48. As illustrated, the seat 40 consists of a frame 50 including upwardly inclined members 52, downwardly inclined members 54, followed by second upwardly inclined members 56. The members 56 are joined together at the upper ends thereof by transverse member 58; whereas the lower ends are connected to pins 48. The lower ends of members 52 and frame members 42 are joined to the front frame member 16 by bracket elements 60. The transverse member 58 is supported by rear vertically extending members 62 on both sides of the vehicle. These members 62 join together with the vehicle frames 44 and 12 at a collar portion 64 on each side of the vehicle. The collar portions 64 surround the rear axle 34 and serve as bearings in which the rear axle is rotatably journaled. A web material 66 comprises the bed portion of the seat 40. A pillow 68 may be provided to support the head of an injured worker who is wearing a SCAPE suit, such as illustrated in FIG. 2.

Upper strap means 70 and lower strap means 72 are provided for encircling the body of the injured worker maintaining him in a stable position on the vehicle seat. Complementary Velcro fastening tapes 74 are provided on the ends of straps 70, 72 for securing mating ends of the straps together.

A breathing air tank 78 is carried on the bottom vehicle frame for supplying breathing air to the injured worker or vehicle operator having a conventional regulator 78a and delivery hose 79.

Figure 3:
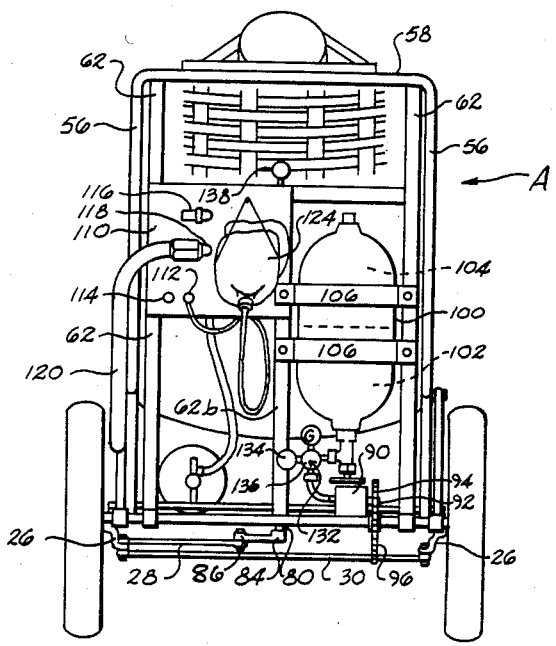
FIG. 3 is a rear view of the vehicle as shown in FIG. 2.

Referring now to means for steering the vehicle, as can best be seen in FIG. 3, a vertical steering rod 80 is provided having a perpendicular handle 82 for imparting rotation thereto. Adjacent the bottom of the rod 80 is a linkage 84 which is pivotably connected at 86 to the steering rod 28 attached to the front steering arm 26 of wheel 20. By this means, the vehicle may be steered by an operator standing at the rear of the vehicle and swinging the handle 82.

Drive means for the vehicle is provided in the form of a hydraulic motor 90 having a drive shaft 92 on which a first drive wheel 94 is carried. There is a second drive wheel 96 carried by the rear axle 34. A drive belt is connected between the first drive wheel 94 and second drive wheel 96 for imparting rotation to the axle and wheels 36 and 38. In the preferred embodiment illustrated, the drive wheels 94 and 96 are sprocket wheels and a drive belt 98 is a chain drive belt. This provides for positive driving in both the forward and reverse directions of the vehicle.

A supply tank 100 is carried vertically on the vehicle and includes a supply of hydraulic fluid 102 carried in a lower portion of the tank and a supply of compressed gas carried in a space above the hydraulic fluid at 104 for pressurizing the hydraulic fluid for delivery and actuation of the hydraulic motor 90. The supply tank 100 is carried by a pair of transverse bars 106 carried between vertical members 62 and an intermediate vertical member 62b. The tank may be strapped to the frame in any suitable manner.

A control panel is shown at 110 which includes a pair of face mask connections at 112 and 114. Also carried by the control are a pair of umbilical cord connections 116 and 118 for connection to an umbilical cord such as at 120. All four of the connections 112-118 are connected to a manifold 122 which is connected by hose 79 to the breathing air tank 78 so that connection to any one of these four connections will deliver a supply of breathing air to the associated supply line or umbilical cord and the person connected to the same. For this purpose, an oxygen face mask may be provided as at 124 for attachment to the face mask connection 112. All four face mask and umbilical cord connections may be conventional quick connect/disconnect couplings.

An auxiliary face mask may also be provided for the vehicle operator in case that hazardous fluids are present and the attendant is not equipped with conventional self-contained atmospheric protection (SCAPE) suits which are typically used at space vehicle launch sites. The self-contained atmospheric protection suit which is illustrated in FIG. 2 at 126 typically includes an interior environment which is supplied breathing air through an umbilical cord such as illustrated at 120. The umbilical cord is plugged into an umbilical cord connector valve 130 which is built into the suit. Thus, the emergency vehicle may be used with an injured worker or vehicle operator wherein the persons are with or without an atmospheric protection suit 126.

In one example, a five-gallon hydraulic accumulator was utilized at 100 with a two horsepower hydraulic motor 90 of the conventional aircraft hydraulic motor type. The accumulator was a conventional aircraft hydraulic accumulator with a pressurized gas over the hydraulic fluid.

Figure 4:
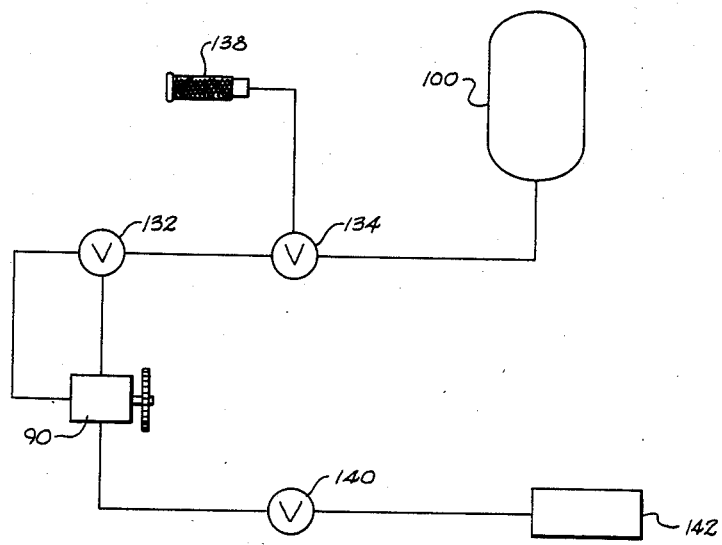
FIG. 4 is a schematic view of a hydraulic drive system for a personnel emergency carrier constructed according to the invention.

As can best be seen in FIGS. 3 and 4, flow control means is illustrated at 132 for controlling the supply of hydraulic fluid to the hydraulic motor and includes a conventional three-way valve 134 having an off, forward, and reverse position. In addition, the flow control means includes a speed control valve 136 which may be a conventional variable type throttling valve for controlling the delivery of hydraulic fluid and thus the speed of the vehicle. The flow control throttling valve 134 is controlled by the rotary motion of a twistable handle 138 mounted on the handle 82. The steerable twistable handle 138 may be connected to the throttling valve by any suitable means such as using a conventional motorcycle throttle control. Finally, the flow control means includes a conventional hydraulic braking valve at 140 connected to the discharge side of the hydraulic motor 90 for braking the vehicle. Fluid discharged through valve 140 will flow into sump 142.

It will be understood, of course, that while the form of the invention herein shown and described constitutes a preferred embodiment of the invention, it is not intended to illustrate all possible form of the invention. It will also be understood that the words used are words of description rather than of limitation and that various changes may be made without departing from the spirit and scope of the invention herein.

What is claimed is:

1. A personnel emergency carrier vehicle for transporting an injured worker from a site where hazardous fluids are present to a safe location at some remote distance away, said emergency vehicle comprising:
   (a) a vehicle frame;
   (b) a platform carried on said vehicle frame for supportably accommodating said injured worker;
   (c) a pair of drive wheels mounted on a first end of said vehicle frame;
   (d) a pair of steerable wheels mounted on a second end of said vehicle frame opposite said first end of said vehicle frame;
   (e) drive means carried by said vehicle frame for imparting drive to said pair of drive wheels;
   (f) said drive means comprising:
      (i) a non-sparking hydraulic drive motor;
      (ii) a hydraulic accumulator containing pressurized hydraulic fluid mounted on said vehicle frame and connected to said non-sparking hydraulic drive motor; and
      (iii) a flow control means connected between said hydraulic drive motor and said hydraulic accumulator for controlling the direction and speed of said personnel emergency carrier vehicle; and
   (g) steering control means mounted on said first end of said vehicle frame and connected for steering to said pair of steerable wheels; said steering control means comprising:
      (i) a steering rod defining a steering axis; said steering rod extending upwards from adjacent said first end of said vehicle frame; and
      (ii) a steering handle connected to said steering rod for turning said steering rod about said steering axis; said steering handle including a throttle connected to said flow control means; said throttle being twistable about an axis substantially radially perpendicular to said steering axis for controlling the amount of hydraulic fluid delivered to said hydraulic motor and thus the speed of said emergency vehicle.

2. The vehicular apparatus of claim 1 comprising: a breathing air tank carried by said vehicle for containing a suitable supply of oxygen to be delivered to an umbilical cord valve; and a control panel carried by said vehicle having a face mask connection connected to said air breathing face mask to said breathing air tank, said control panel having an umbilical cord connection for connecting said umbilical cord valve to a self-contained atmospheric protection suit.

3. The vehicular apparatus of claim 2 including an auxiliary face mask connector carried by said control panel for connection to a second air breathing face mask that can be worn by an operator of said vehicle for protection against said hazardous gasses.

4. The apparatus of claim 2 wherein said control panel includes an auxiliary umbilical cord connection for connection to a second umbilical cord valve of a self-contained atmospheric protection suit of an attendant operator.

5. The apparatus of claim 1 wherein said hydraulic accumulator includes a vertical supply tank containing a hydraulic fluid in a lower portion of said tank and a pressurizing gas occupying a space above said hydraulic fluid.

6. The apparatus of claim 1 wherein said drive means further includes:
   a drive shaft driven by said hydraulic drive motor;
   a first drive wheel carried fixed for rotation on said drive shaft;
   an axle on which said rear driven wheels are fixed;
   a second drive wheel fixedly carried on said axle;
   a drive belt connecting said first and second drive wheels.

7. The apparatus of claim 1 wherein said flow control means includes a forward and reversing valve for reversing the drive of said hydraulic motor and vehicle.

8. The apparatus of claim 7 wherein said flow control means includes a variable flow control valve for throttling the flow of hydraulic fluid to said hydraulic motor and thus for varying the speed of said vehicle.

9. The apparatus of claim 1 wherein said flow control means includes a hydraulic brake valve on a discharge side of said hydraulic motor which is operative to facilitate braking of said vehicle.

10. A personnel emergency carrier vehicle for transporting an injured worker in the presence of hazardous gases at a spaced launch vehicle site over extended distances wherein the injured worker is provided with a self-contained atmospheric protection suit which includes an umbilical cord connector for connecting the interior of the suit with an outside supply of oxygen, said emergency vehicle comprising:
   a vehicle frame;
   a contoured personnel carrier platform carried by said vehicle frame for supportably accommodating the injured worker at an inclined position;
   a breathing air tank carried by said vehicle frame for supplying said outside supply of oxygen;
   connection means associated with said breathing air tank for allowing said breathing air tank to communicate with said umbilical cord connector of said self-contained atmospheric protection suit so that breathing air may be supplied to said injured worker;
   a pair of steerable front wheels carried adjacent a front end of said vehicle frame and supporting said vehicle frame above the ground;
   a pair of driven wheels carried adjacent a rear of said frame for driving said vehicle and supporting said vehicle frame above the ground;
   a vertical steering axis carried adjacent said rear of said vehicle frame having a steering handle extending outwardly from said steering axis;
   linkage means connecting said vertical steering axis and said steerable front wheels so that movement of said steering axis at said rear of said vehicle frame causes a corresponding steering movement of said steerable front wheels;
   a reversible hydraulic drive motor carried by said vehicle frame for propelling said carrier vehicle without giving off excessive heat;
   a hydraulic accumulator for containing a pressurized hydraulic fluid for driving said hydraulic motor, said hydraulic accumulator consisting of a vertical supply tank carried by said vehicle frame having a hydraulic fluid carried in a lower portion and a pressurized gas carried in a space above said lower portion;
   a hydraulic hose connecting said hydraulic accumulator to said hydraulic motor;

a flow control means associated with said hydraulic line connecting said hydraulic accumulator and said hydraulic motor;

a three-way valve included in said flow control means for having an off, forward, and reverse position for controlling the operation of said hydraulic motor in any one of said three modes of operation;

a hydraulic brake valve on a discharge side of said hydraulic motor included in said flow control means for operating to facilitate braking of said vehicle;

a throttling valve included in said flow control means for controlling and varying the flow of hydraulic fluid to said hydraulic motor to vary the speed of said vehicle accordingly; and a throttle connected to said throttling valve for controlling said throttling valve.

11. The apparatus of claim 10 wherein said throttle includes a twistable handle included in said steering handle which is connected to said throttle valve.

12. The apparatus of claim 10 including straps carried about an upper and lower portion of said inclined platforms for immobilizing and affixing said worker on said vehicle.

13. The apparatus of claim 10 wherein said drive means for transmitting a driving motion from said hydraulic motor to said rear driven wheels includes a drive shaft driven by said hydraulic motor;

a first drive wheel fixed for rotation on said drive shaft;

an axle on which said rear driven wheels are fixed;

a second drive wheel affixed to said axle;

a drive belt connecting said first and second drive wheels.

* * * * *